United States Patent

[11] 3,610,396

| [72] | Inventor | Momir Babunovic<br>Des Peres, Mo. |
|---|---|---|
| [21] | Appl. No. | 834,705 |
| [22] | Filed | June 19, 1969 |
| [45] | Patented | Oct. 5, 1971 |
| [73] | Assignee | Barry-Wehmiller Company<br>St. Louis, Mo. |

[54] ARTICLE COMBINER
15 Claims, 3 Drawing Figs.

[52] U.S. Cl. .................................................... 198/30
[51] Int. Cl. .................................................... B65g 47/26
[50] Field of Search .......................................... 198/29, 30

[56] References Cited
UNITED STATES PATENTS

| 1,990,549 | 2/1935 | Kimball | 198/30 |
| 2,560,995 | 7/1951 | Stiles | 198/30 X |
| 3,117,665 | 1/1964 | Nekola | 198/30 |

*Primary Examiner*—Edward A. Sroka
*Attorney*—Gravely, Lieder & Woodruff

ABSTRACT: An article combiner includes adjacent supply and delivery conveyors and converging guides extending obliquely across the conveyors for channelling a haphazard mass of articles on the supply conveyor into a single file at the infeed end of the delivery conveyor. The guides have yieldable bars which are engaged by the articles, though yielding under pressure from the articles, act to retard the articles sufficiently to prevent formation of jams as the articles are channelled into a single file. A moving belt trained around pulleys on one of the guides has a friction surface which also engages the articles and spins them to further retard the formation of jams.

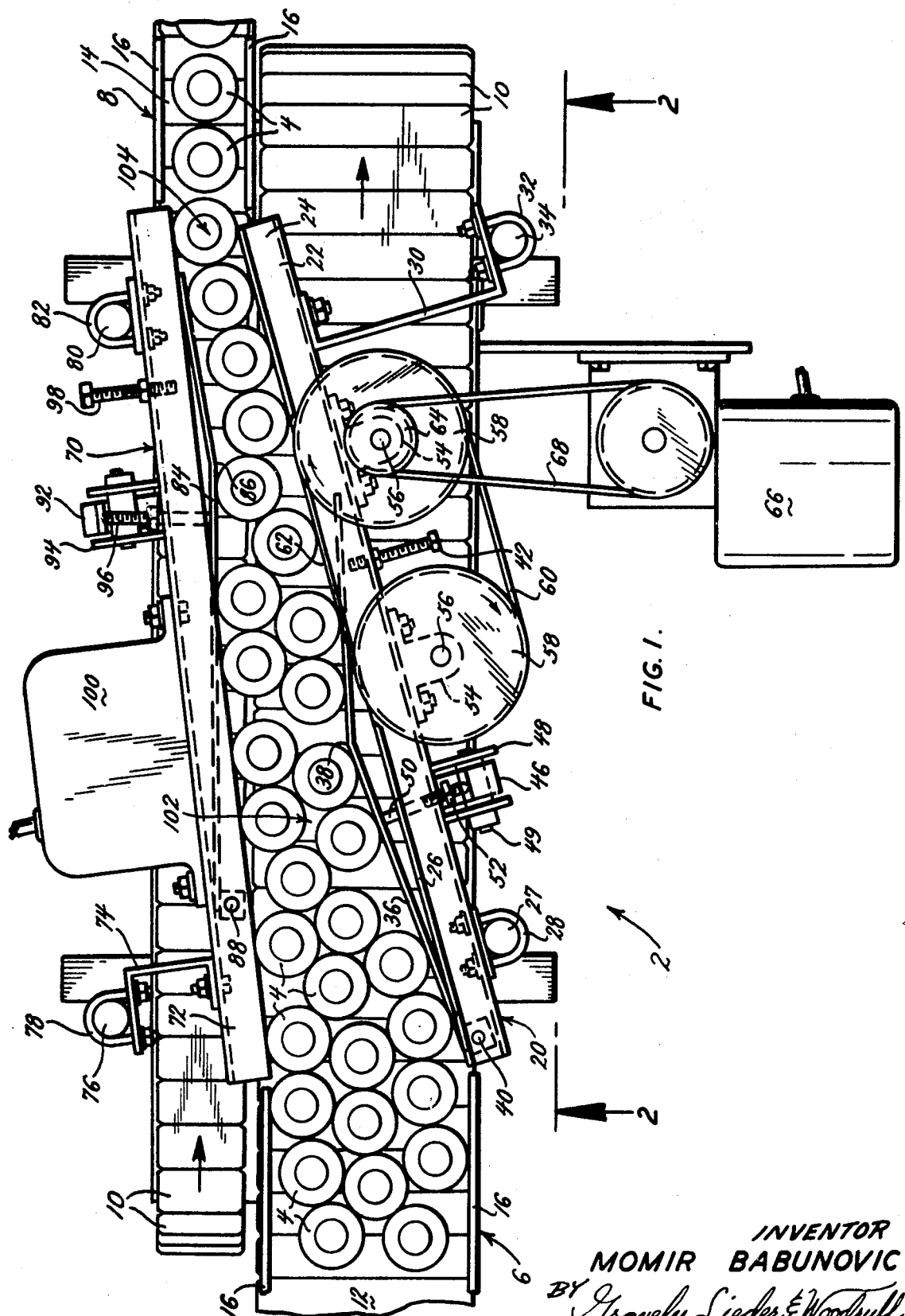

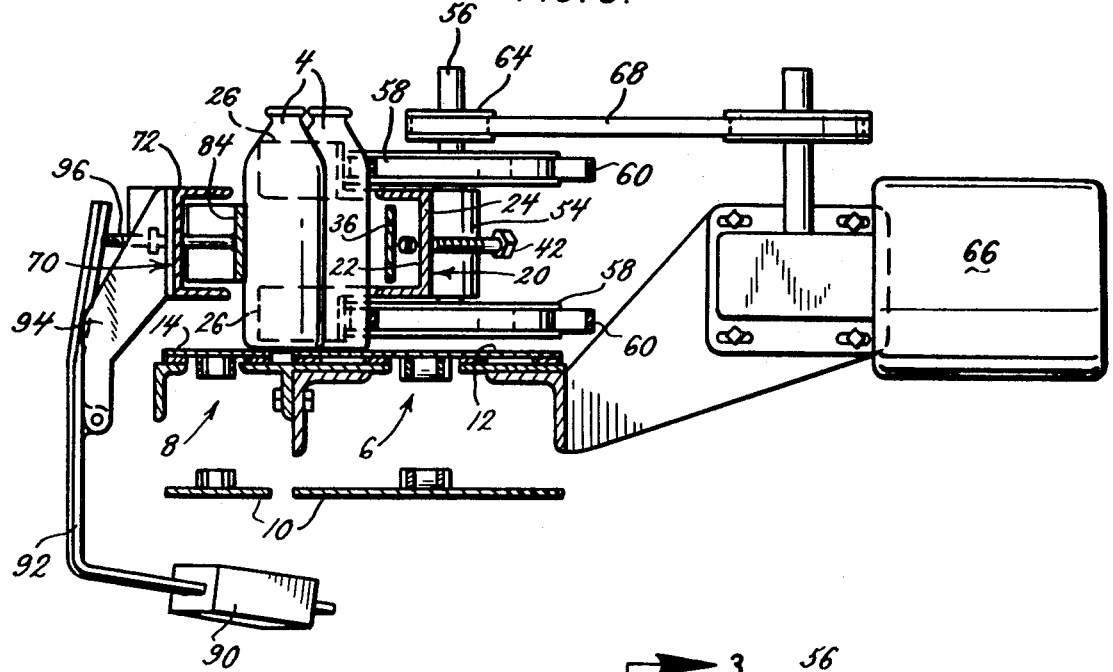
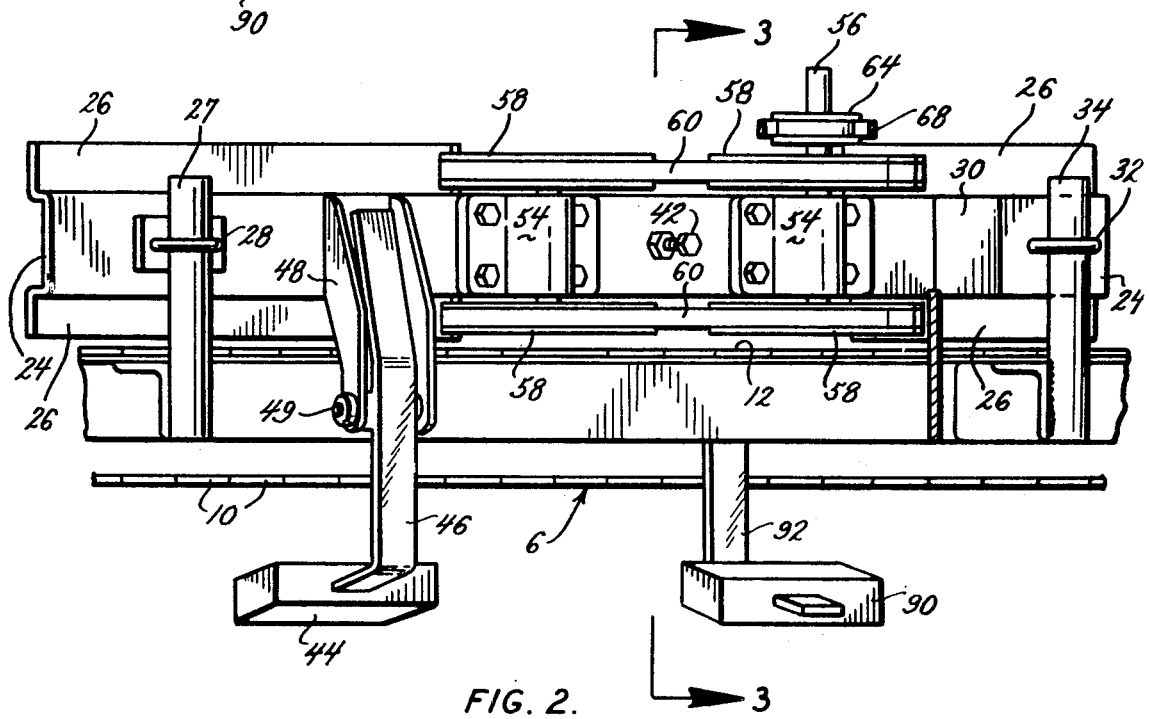

3,610,396

ARTICLE COMBINER

BACKGROUND OF THE INVENTION

This invention relates in general to conveyor systems and more particularly to an article combiner for converting a haphazard flow pattern of articles into an orderly one.

Currently, bottles and similar containers are filled, labeled and subjected to other processing operations in machines which operate at extremely high speeds to minimize the cost of such operations. Indeed, some of the machines have the capability of processing in excess of 800 containers per minute. Since processing machines of the type under consideration accept the containers one at a time and only from a single moving file of containers, so-called article combiners have been developed for organizing disorderly arrays of containers into single file flow patterns without interruption of the flow. One type of article combiner is Nekola in Nekola et al. U.S. Pat. No. 3,117,665, dated Jan. 14, 1964.

Most article combiners of current manufacture, however, tend to jam at speeds in excess of approximately 600 articles per minute, and are, therefore, not suitable for use with high-speed processing machines. In other words, when the flow through such machines exceeds 600 containers per minute the containers have a tendency to lodge together and form blockages or "bridges" as the containers are funnelled together into a single file. This is particularly true when the containers have fluted side faces, since the flutes on adjacent containers tend to interlock when the containers are channelled into a single file.

SUMMARY OF THE INVENTION

One of the principal objects of the present invention is to provide a combiner for converting a disorderly flow pattern of articles into an uninterrupted orderly one of high density per unit of time. Another object is to provide a combiner of the type stated for feeding containers to high-speed processing equipment. A further object is to provide a combiner which is similar to the combiner disclosed in Nekola U.S. Pat. No. 3,117,665, but possesses improved operating characteristics. An additional object is to provide a combiner in which the normal tendency to jam is reduced to an absolute minimum. Yet another object is to provide a combiner which handles containers having fluted side faces at high speeds. Still another object is to provide a combiner which is simple in construction and reliable in operation. These and other objects and advantages will become apparent hereinafter.

The present invention is embodied in an article combiner including first and second conveyors and guide means for channelling a haphazard mass of articles from the first conveyor into a single file which is picked up by the second conveyor. A moving friction surface moves along the guide means for rotating the articles as they are being channelled into the single file.

The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 1 is a plan view of an article combiner constructed in accordance with and embodying the present invention;

FIG. 2 is a side elevational view of the combiner taken along line 2—2 in FIG. 1; and FIG. 3 is a sectional view taken along line 3—3 of FIG. 2.

DETAILED DESCRIPTION

Referring now to the drawings, 2 designates an article combiner for transforming a disorderly array of moving articles 4 into a single line of uniformly spaced articles 4. While the particular articles 4 illustrated are glass bottles, they may also be cans or any other type of article having a flat bottom and generally circular sidewalls.

The combiner 2 is similar to the combiner disclosed in Nekola U.S. Pat. No. 3,117,665 and includes a supply conveyor 6 and a delivery conveyor 8 located in side-by-side relation at their discharge and infeed ends respectively (FIG. 1). Both of the conveyors 6 and 8 are composed of a plurality of plates 10 hinged into an endless chain, and each conveyor 6 and 8 is trained over a drive sprocket (not shown) which is powered by a gear motor or some other suitable power source (not shown). The upper passes of the conveyors 6 and 8 form article supporting surfaces 12 and 14, respectively, which are positioned at the same elevation and move in the same direction so that the articles may be transferred from the former to the latter without interruption (FIGS. 1 and 2). The supply conveyor 6 is wide enough to accommodate several articles 4 arranged in side-by-side relation and originates at a location where the articles 4 are placed randomly upon it so that they do not assume any particular order. The delivery conveyor 8, on the other hand, is wide enough to accommodate only one row or file or articles 4, and it terminates at a filling machine or some other machine which accepts the articles 4 one at a time and performs some processing operation on them. The article supporting surfaces 12 and 14 of the conveyors 6 and 8, respectively, are each bounded by a pair of sidewalls 16 for preventing the articles 4 from sliding off of them.

At the discharge end of the supply conveyor 6 where it is located in juxtaposition to the delivery conveyor 8, a guide 20 extends obliquely across the supporting surface 12 for diverting the articles 4 moving with that surface 12 onto the supporting surface 14 of the delivery conveyor 8. The guide 20 includes a guide member or rail 22 having a channel-shaped center portion 24 and a pair of vertical flanges 26 (FIG. 2) projecting upwardly and downwardly therefrom and facing the articles 4 on the conveyor 6. The outermost end of the rail 22, that is the end located at the side of supply conveyor 6 remote from the delivery conveyor 8, is secured to a rigid mounting post 27 (FIGS. 1 and 2) by means of a U-bolt 28, the legs of which pass around the post 27 and through the channel-shaped portion 24 of the rail 22. At the opposite end of the rail 22, the channel-shaped portion 24 is secured to an extension member 30 (FIG. 1) which projects across the supporting surface 12 and is attached by means of a U-bolt 32 to another rigid mounting post 34 also located at the outwardly presented side of the supply conveyor 6 but further downstream than the post 27. The rail 22 carries a yieldable bar 36 having a centrally located elbow bend 38 which is pointed away from the flanges 26 and is normally located outwardly from them. One end of the yieldable bar 36 is hinged to the outer end of the rail 22 by a vertical pin 40 which extends through the channel-shaped portion 24 and is located such that the bar 36 is generally flush with the flanges 26 at the end, while the opposite or inner end of the bar 36 is free and is disposed within the confines of the channel-shaped portion 24. The innermost limit for movement of the free end of the bar 36 into the channel-shaped portion 24 is determined by an adjustable stop 42 which is threaded through the bight segment of the channel-shaped portion 24 on the rail 22.

The yieldable bar 36 is urged outwardly away from the flanges 26 by a counterweight 44 (FIG. 2), which is located beneath the supply conveyor 6 and is suspended from the rail 22 on an L-shaped lever arm 46, the intermediate portion of which is attached by a pivot pin 49 to a bifurcated bracket 48 mounted on the rail 22. The arm 46 extends upwardly between the furcations of the bracket 48 and at its upper end bears against a threaded stud 50 which projects through the channel-shaped portion 24 and at its opposite end is secured to the yieldable bar 36 upstream from the elbow bend 38. The threaded segment of the stud 50 is fitted with a nut 52 for limiting inward movement of the stud 50. By means of the foregoing construction, the tendency of the counterweight 44 to swing downwardly is transformed into an axially directed force on the stud 50, which force urges the bar 36 away from the flanges 26.

At the free end of the yieldable bar 36 where the rail 22 approaches the delivery conveyor 8, the vertical flanges 26 of the rail 22 are cut away, and a pair of pillow blocks 54 are bolted to the outwardly presented surface of the channel-shaped portion 24. The pillow blocks 54 serve as a journal for a pair of vertical shafts 56, and each shaft 56, in turn, carries a pair of pulleys 58 which are positioned at the levels of the flanges 26 and have their peripheries approximately tangent to the plane defined by the inwardly facing surfaces of the flanges 26. Trained around the pulleys 58 at each flange 26 are endless belts 60 which are preferably formed from an elastomeric material and have flat outwardly presented friction surfaces 62 projecting beyond the peripheries of the pulleys 58. The friction surfaces 62 on the innermost runs of the belts 60 furthermore project beyond the inwardly presented faces of their respective flanges 26 so that they will engage and spin the articles 4 which come in contact with them (FIG. 1). One of the shafts 56 projects upwardly beyond its upper pulley 58 where it is provided with a drive pulley 64 which is driven by a variable speed gear motor 66 through a belt 68.

Directly opposite the guide 20, another guide 70 extends obliquely across the supporting surface 14 on the delivery conveyor 8. The guide 70 includes a guide member or rail 72 having a channel-shaped cross-sectional configuration, and the rail 72 is mounted such that its channel opens outwardly toward the guide 20. One end of the rail 72 is disposed at the inner edge of the supply conveyor 6, and that end is connected with an extension member 74 which is fastened to a rigid mounting post 76 by means of a U-bolt 78 (FIG. 1). The opposite end of the rail 72 is connected directly to another mounting post 80 by a U-bolt 82.

The rails 22 and 72 are approximately the same length and have their ends located opposite each other across the supply conveyor 6 and the delivery conveyor 8 (FIG. 1). Since the supply conveyor 6 is considerably wider than the delivery conveyor 8 the rails 22 and 72 converge toward the latter, and indeed, they are spaced apart a distance slightly greater than the diameter of an article 4 at the delivery conveyor 8. On the other hand, at the supply conveyor 6 the ends of the rails 22 and 72 are spaced apart a sufficient distance to receive the full random flow of articles 4 on the supply conveyor 6.

Like the guide 20, the guide 70 includes a yieldable bar 84 having an elbow bend 86 which projects outwardly beyond the rail 72 and points toward the rail 22, but the elbow bend 86 is offset downstream from the elbow bend 38. The upstream end of the yieldable bar 84 is furthermore disposed within the channel of the rail 72 and is hinged to the rail 72 at that end by means of a pin 88 which is located downstream from the pin 40 of the other yieldable bar 36. The opposite end of the bar 84 is free and is very close to the downstream end of the guide 70. The spacing between the bar 84 and the friction surfaces 62 of the belts 60 is such that at the upstream end of the belts 60 two articles 4 can fit abreast of one another, while at the downstream end only a single file of articles 4 will fit.

The yieldable bar 84 is urged toward the bar 36 by a counterweight 90 supported on a lever 92 which in turn is pinned to a bifurcated bracket 94. The upper end of the lever bears against a stud 96 which is welded to and projects outwardly from the yieldable bar 84. Similarly, the movement of the free end of the bar 84 into the channel of the rail 72 is limited by an adjustable stop 98.

The guide 70 is further provided with a vibrator 100 which is bolted against the outwardly presented surface of the rail 72.

Thus, the guides 20 and 70 define a converging flow channel 102 (FIG. 1) leading from the supply conveyor 6 to the delivery conveyor 8, and that flow channel 102 terminates at a throat 104 located over the delivery conveyor 8. The effective width of the channel 102 varies slightly with the movement of the yieldable bars 36 and 84.

OPERATION

In use the conveyors 6 and 8 are powered such that their supporting surfaces 12 and 14, respectively, move in the same direction with the latter moving somewhat faster than the former. The gear motor 66 is also energized so that the inner passes of the belts 60, that is the passes adjacent to the flanges 26, move in the same direction as the supporting surface 12 of the supply conveyor 6 over which they are disposed. The speed of the belts 60 should be slightly greater than the speed of the supply conveyor 8, the best results being obtained when the ratio of the speeds for the two is approximately 6 to 5.

Once the conveyors 6 and 8 and the belts 6 are energized, articles 4 such as bottles are loaded onto the supporting surface 12 of the supply conveyor 6 upstream from the guides 20 and 70. The articles 4 may be, and normally are, placed on the conveyor 6 at random so that the resulting flow pattern which advances toward the guides 20 and 70 is haphazard array of articles 4. When the articles 4 reach the guide 20 they are diverted toward the delivery conveyor 8 by the yieldable bar 36, and by reason of the convergence of the flow channel 102 formed between the guides 20 and 70, the articles 4 are aligned into a single row or file by the time they reach the throat 104. At that point the delivery conveyor 8 picks up the articles 4 and transports them away in a single file and at uniformly spaced intervals for subsequent processing.

Since the supply conveyor 6 is wider than the delivery conveyor 8 and thereby possesses a greater capacity, articles 4 tend to jam or crowd together in the converging flow channel 102 where the random flow pattern is organized into a single file. The articles 4 tend to back up or accummulate upstream from the guides 20 and 70, while the plates 10 of the conveyor 6 slide beneath them. The yielding nature of the yieldable bars 36 retards blockages or bridges, as they are sometimes called, in the flow channel 102 since two side-by-side articles 4 are generally not given an opportunity to tightly wedge together in side-by-side relation within the flow channel 102. More specifically, when two articles 4 assume such a position one or both of the yieldable bars 36 or 84 will yield against the force imposed by the counterweights 44 or 90 and allow one of the articles 4 to pass on before the other. Since the elbow bends 38 and 86 are longitudinally offset from one another, the channel 102 assumes a slight dogleg configuration as it converges toward the throat 104, and this further retards the tendency of the articles to lodge in the channels 102. Moreover, the offset disposition of the elbow bends 38 and 86, with respect to one another, as well as the corresponding offset between the pivot pins 40 and 88, and the counterweights 44 and 90, create an asymmetrical relationship between the operation of the yieldable bars 36 and 84. This asymmetrical operation of the bars 36 and 84 imparts a kneading action to the random array of articles 4 in the channel 102, working the articles 4 into single file. The operation of the bars 36 and 84 is more fully explained in U.S. Pat. No. 3,117,665.

The kneading action of the bars 36 and 84 is supplemented by the belts 60, the friction surfaces 62 of which do not yield to any significant extent as do the bars 36 and 84, but nevertheless engage the sides of the articles 4 as they pass off of and beyond the free end of the bar 36. Since the belts 60 have a velocity greater than that of the supply conveyor 6, the articles 4 engaged by it are rotated on an urged along the supporting surface 12. The friction surface 62 of the belt extends along that portion of the flow channel 102 where jams are most likely to occur, and by spinning one of two articles 4 of a potential blockage, the two articles 4 are thrown toward alignment with the path through the channel 102. In this connection, it is significant to note that the inner passes of the belts 60 bound the flow channel 102 from an upstream position at which two articles 4 may be disposed abreast of one another in the channel 102 to a downstream position at which only one article 4 will fit in the channel 102. Thus, the interaction between the relatively unyieldable belts 60 and the opposite yieldable bar 84 serves to break up flow patterns which might otherwise jam.

The article combiner 2 with the belts 60 energized is capable of handling 900 articles per minute, whereas combiners without such belts cannot be operated in excess of about 600 articles per minute. Moreover, the presence of the belts 60 permits a shorter flow channel 102, and therefor the combiner 2 is more compact than similar combiners which do not have belts 60. Furthermore, the combiner 2 handles articles 4 having fluted sidewalls at the highspeeds, notwithstanding the fact that fluted articles 4 have a natural tendency to jam.

The vibrator 100 also assists in retarding blockages and thereby supplements the kneading action of the bars 36 and 84 and the spinning action of the belts 60.

This invention is intended to cover all changes and modifications of the example of the invention herein chosen for purposes of the disclosure which do not constitute departures from the spirit and scope of the invention.

What is claimed is:

1. An article combiner for transforming a haphazard array of articles into a single file, said combiner comprising: a first conveyor for supporting and moving the haphazard array of articles; a second conveyor positioned adjacent to the first conveyor for receiving articles therefrom; first and second guide members extending obliquely across the first and second conveyors, respectively, and converging toward the second conveyor in the formation of a converging flow channel for channeling the articles into a single file and diverting them onto the second conveyor; bars connected to the guide members and extending generally in the same direction as the guide members, but being presented inwardly therefrom at least in part so that the articles will engage the bars as they pass toward the terminal end of the flow channel, the bars being shiftably mounted about pivots fixed in position with respect to the guide members so that the bars may move away from each other, the pivot for the bar connected to the first guide member being offset longitudinally of the first conveyor from the pivot for the bar connected to the second guide member; means for urging the bars inwardly; and a moving friction surface located along the flow channel for rotating articles as they are channelled into a single file.

2. An article combiner according to claim 1 wherein the bars are provided with elbow bends which point away from the respective guide members on which those bars are mounted; and wherein the elbow bends on the bars are longitudinally offset so that the flow channel between the guide members assumes a dogleg configuration.

3. An article combiner for transforming a haphazard array of substantially circular articles into a single file; said combiner comprising: a supply conveyor capable of supporting and moving the articles in a haphazard array with at least two articles abreast of one another; a discharge conveyor positioned adjacent to and moving generally in the same direction as the supply conveyor for receiving articles from the supply conveyor and for conveying the articles away from the supply conveyor in a single file; first and second opposed guides, one of which extends obliquely across the supply conveyor and the other of which extends obliquely across the discharge conveyor, the guides converging and at least partially defining a converging flow channel having an entrance over the supply conveyor and a throat over the discharge conveyor, the entrance being wide enough to accept at least two articles positioned abreast of one another on the supply conveyor and the throat being wide enough to accommodate only a single file of articles so that the discharge conveyor carries the articles away from the throat in a single file; a moving friction surface located along the first guide and positioned to engage the sides of articles in the flow channel, the friction surface moving longitudinally of the first guide in generally the same direction as the articles are advanced along the supply conveyor and at a velocity different from the velocity of the supply conveyor so that articles engaged by the friction surface will be rotated, the friction surface further extending along the flow channel from an upstream position at which the flow channel is wide enough to accommodate two articles abreast of one another to a downstream position at which the channel is wide enough to accommodate only one article so that the articles at the downstream position are substantially in a single file; yieldable means positioned along the second guide directly across the flow channel from the friction surface for the full length of that portion of the friction surface which is exposed to the articles in the flow channel whereby the yieldable means face the friction surface, the yieldable means being movable toward and away from the friction surface in the presence of articles between it and the friction surface so as to vary the effective width of the flow channel at the friction surface; and means for urging the yieldable means toward the friction surface whereby two articles will not lodge abreast of one another in the flow channel.

4. An article combiner according to claim 14 wherein the friction surface is located above the supply conveyor; and wherein the friction surface moves at a speed greater than the speed of the supply conveyor.

5. An article combiner according to claim 4 wherein the friction surface is on an endless belt having a run which passes adjacent to the first guide.

6. An article combiner according to claim 3 wherein the first guide extends obliquely across the supply conveyor and the second guide extends obliquely across the discharge conveyor.

7. An article combiner according to claim 6 wherein the friction surface moves at a velocity greater than the velocity of the supply conveyor.

8. An article combiner according to claim 3 wherein additional yieldable means are positioned along the first guide for movement toward and away from the other yieldable means along the second guide so to vary the effective width of the flow channel; wherein the additional yieldable means as it moves changes surface area of the friction surface exposed to the articles for engagement therewith; and wherein means urge the additional yieldable means toward the other yieldable means positioned along the second guide.

9. An article combiner according to claim 8 wherein at least one endless belt has an inwardly presented run which passes along the first guide and forms the friction surface; and wherein the additional yieldable means project beyond and retract behind the inner run of the belt whereby the effective width of the flow channel at the friction surface is varied.

10. An article combiner according to claim 9 wherein the additional yieldable means extending along the first guide comprises a bar having its upstream end pivoted about an axis fixed with respect to the first guide and its downstream end free and normally presented behind the inner run of the belt.

11. An article combiner according to claim 10 wherein the yieldable means extending along the second guide comprises a bar having its upstream end pivoted about an axis fixed with respect to the second guide and its downstream end free for movement toward and away from the second guide.

12. An article combiner according to claim 3 wherein a pair of endless belts have inwardly presented runs which are spaced from one another and pass along the first guide, the inner runs of the belts forming the friction surface; and wherein a bar extends along the first guide and is bent intermediate its end so as to project beyond the first guide toward the second guide, the upstream end of the bar being pivoted about an axis fixed with respect to the first guide and the downstream end of the bar being free and projecting into the space between the inner runs of the pair of belts.

13. An article combiner according to claim 3 wherein the yieldable means comprises a bar extending along the second guide and bent intermediate its ends, the bent portion of the bar projecting toward and being located generally opposite to the friction surface, the upstream end of the bar being pivoted about an axis which is fixed with respect to the second guide and the downstream end being free. An article combiner according to claim 13 and further characterized by another bar extending along the first guide and bent intermediate its end, the bent portion projecting toward the second guide and being located upstream from the friction surface, and the bent portion of the bar extending along the second guide, the upstream end of the other bar being pivoted about an axis fixed with respect to the first guide and the downstream end being free and projecting outwardly of the channel and beyond the friction surface at the friction surface.

15. In an article-combining apparatus to combine the flow of a haphazard array of articles into a single file flow comprising: a pair of parallel conveyors having generally horizontally moving articles-supporting surfaces, said conveyors moving in the same direction, a pair of guide means operatively supported above said article-supporting surfaces and spaced apart, said guide means having article receiving ends and article discharge ends, with said receiving ends being located over one of said pair of conveyors and said discharge end being located over the other of said pair of conveyors, and said receiving ends of said guide means being spaced farther apart than said discharge ends such that the haphazard array flows between said receiving ends and said single file flow issues at said discharge ends, and powered article moving means carried by one of said guide means and having a friction surface adapted to move lengthwise of said conveyors in the direction of flow and being presented to engage articles and induce article movement on said conveyors during conveyance.

UNITED STATES PATENT OFFICE
CERTIFICATE OF CORRECTION

Patent No. 3,610,396      Dated October 5, 1971

Inventor(s) Momir Babunovic

It is certified that error appears in the above-identified patent and that said Letters Patent are hereby corrected as shown below:

Col. 1, line 18, after "is", cancel "Nekola", first occurrence, and substitute therefor -- "disclosed".

Col. 2, line 54, after "at" and before "end,", cancel "the" and substitute therefor -- "that".

Col. 4, line 13, "belts 6" should be cancelled and "belts 60" substituted therefor.

Col. 4, line 64, after "on" and before "urged", cancel "an" and substitute therefor -- "and".

Col. 6, line 18, Claim 4 should depend from claim 3 and not "14".

Col. 6, line 74, after "free.", begin a new paragraph as Claim 14.

Signed and sealed this 25th day of April 1972.

(SEAL)
Attest:

EDWARD M. FLETCHER, JR.       ROBERT GOTTSCHALK
Attesting Officer      Commissioner of Patents